(12) United States Patent
Ianakiev et al.

(10) Patent No.: US 7,081,626 B2
(45) Date of Patent: Jul. 25, 2006

(54) APPARATUS AND METHOD FOR TEMPERATURE CORRECTION AND EXPANDED COUNT RATE OF INORGANIC SCINTILLATION DETECTORS

(75) Inventors: Kiril D. Ianakiev, Los Alamos, NM (US); Sin Tao Hsue, Santa Fe, NM (US); Michael C. Browne, Los Alamos, NM (US); Jeffrey M. Audia, Abiquiu, NM (US)

(73) Assignee: The Regents of the University of California, Los Alamos, NM (US)

( * ) Notice: Subject to any disclaimer, the term of this patent is extended or adjusted under 35 U.S.C. 154(b) by 273 days.

(21) Appl. No.: 10/858,620

(22) Filed: Jun. 2, 2004

(65) Prior Publication Data
US 2005/0269513 A1    Dec. 8, 2005

(51) Int. Cl.
*G01T 1/208* (2006.01)
(52) U.S. Cl. .......................... 250/363.07; 250/363.09; 250/362
(58) Field of Classification Search ........... 250/363.07, 250/363.09, 362
See application file for complete search history.

(56) References Cited

U.S. PATENT DOCUMENTS

| | | | | |
|---|---|---|---|---|
| 4,482,808 A | * | 11/1984 | Tominaga et al. | 250/392 |
| 5,461,230 A | * | 10/1995 | Winemiller | 250/261 |
| 5,884,234 A | * | 3/1999 | Jorion et al. | 702/66 |
| 6,215,122 B1 | * | 4/2001 | Clifford et al. | 250/369 |
| 6,407,390 B1 | | 6/2002 | Rozsa | |
| 6,525,323 B1 | * | 2/2003 | Vesel et al. | 250/369 |

* cited by examiner

*Primary Examiner*—Albert Gagliardi
(74) *Attorney, Agent, or Firm*—Mark N. Fitzgerald (57) ABSTRACT

The present invention includes an apparatus and corresponding method for temperature correction and count rate expansion of inorganic scintillation detectors. A temperature sensor is attached to an inorganic scintillation detector. The inorganic scintillation detector, due to interaction with incident radiation, creates light pulse signals. A photoreceiver processes the light pulse signals to current signals. Temperature correction circuitry that uses a fast light component signal, a slow light component signal, and the temperature signal from the temperature sensor to corrected an inorganic scintillation detector signal output and expanded the count rate.

14 Claims, 12 Drawing Sheets

APPARATUS AND METHOD FOR TEMPERATURE CORRECTION AND EXPANDED COUNT RATE OF INORGANIC SCINTILLATION DETECTORS

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to inorganic scintillation detectors, and, more particularly, to temperature correction and expanded count rate of inorganic scintillation detectors.

BACKGROUND OF THE INVENTION

Inorganic scintillation detectors convert incoming radiation (alpha, beta, or gamma) into pulses of light (optical photons). The amplitude (and frequency) of the pulses of light corresponds directly to the energy imparted by the incident radiation. Inorganic scintillation detectors (NaI(Tl), CsI(Tl), CsI(Na), BGO, $LaCl_3$, and the like) have been used for many years in gamma ray spectrometry and have numerous commercial applications. Inorganic scintillation detectors, as traditionally understood, exhibit strong temperature dependence and corresponding count rate limitations.

Figure 1:
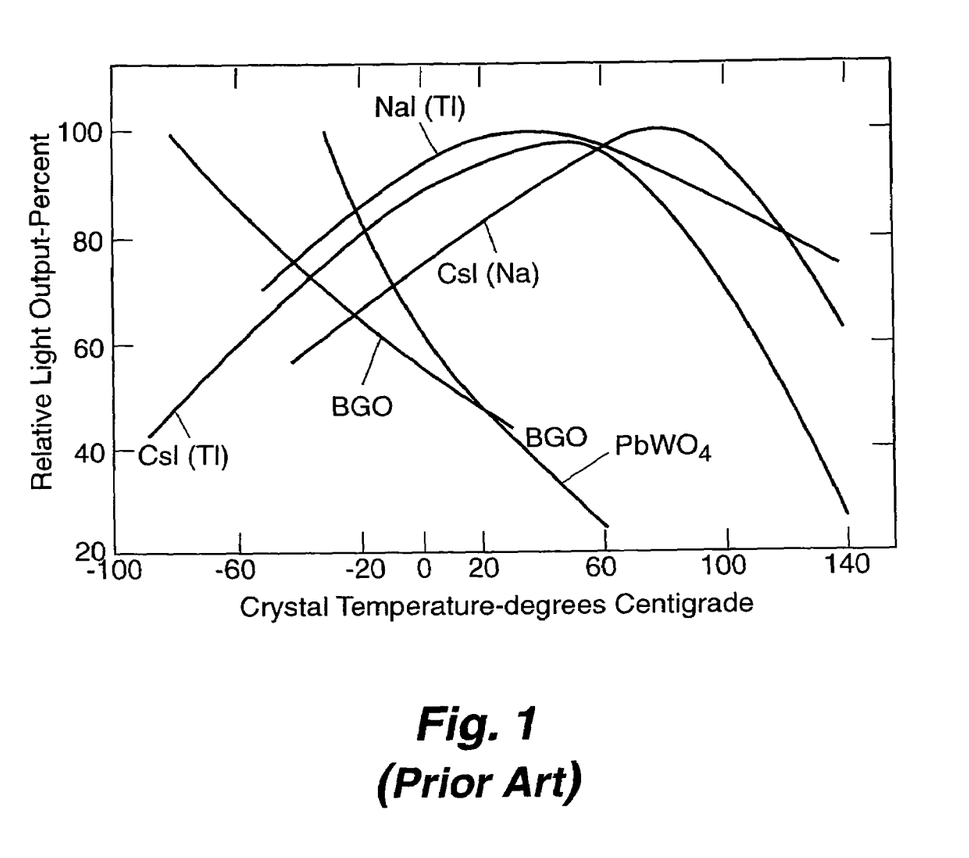
FIG. 1 graphically shows the historical understanding of the temperature dependency of inorganic scintillators.
Figure 2:
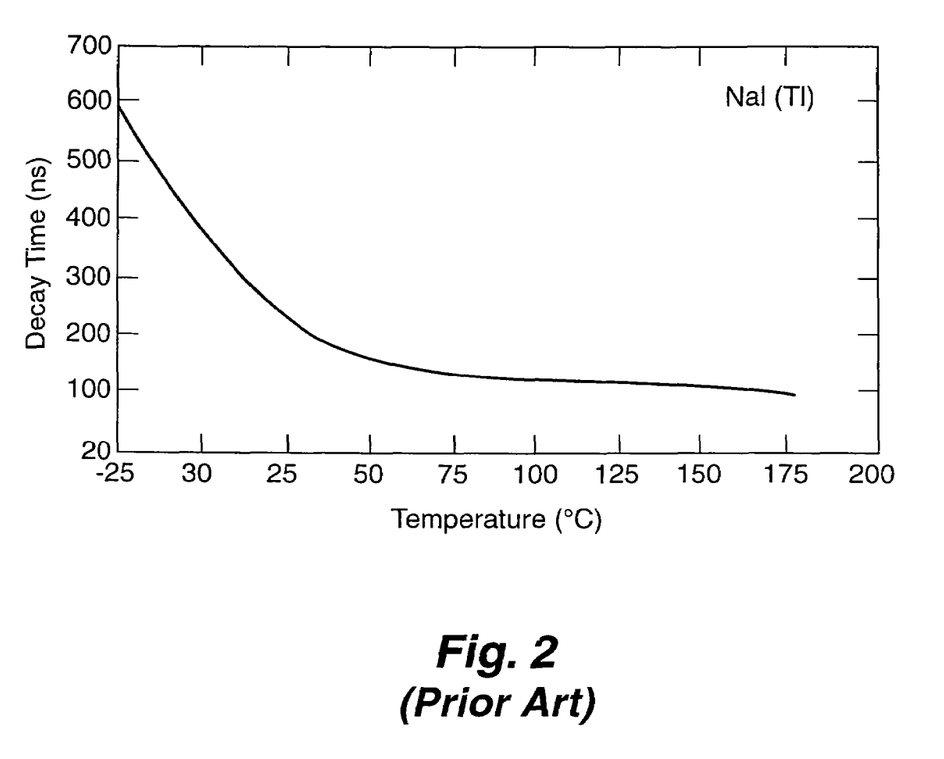
FIG. 2 graphically shows the historical understand of the dependence of the NaI (Tl) light decay time constant corresponding to the temperature of the NaI (Tl) crystal.

FIG. 1 shows plots comparing the temperature dependencies for different inorganic scintillators. The temperature dependence exhibited by inorganic scintillation detectors is nonlinear, and, thus, it is difficult to compensate accurately over a given temperature range. FIG. 2 shows the dependence of the scintillation light decay constant exhibited by NaI(Tl) due to the temperature of the NaI(Tl) crystal. Again, it is apparent that the light decay constant is nonlinear with respect to the varying temperature of the crystal.

There are actually four temperature factors that affect the spectrum (gain) dependence of inorganic scintillation detectors. The four factors are: [1] temperature coefficients of the photomultiplier tube (PMT) gain and photo-cathode sensitivity; [2] temperature dependence of the scintillator light yield; [3] temperature dependence of the scintillator decay time constant; and [4] the characteristic of the signal shaper that is used in the electronics package. Thus, a model that can accounts for all four-temperature factors is more accurate than a model with a single temperature-dependent time constant.

There are four historical methods recognized to address the temperature effects on gain stabilization:

First, scintillators can be stabilized electronically by introducing an americium-241 seed and tracking the alpha peak and adjusting the gain of gamma peaks. However, the temperature response of alpha particles is different than for electrons generated by gamma-ray interactions, so additional temperature compensation is still required.

Second, mapping the temperature versus gain (FIG. 1) for the particular inorganic detector used and then offsetting the resultant output accordingly. In this method, a temperature sensor is attached to the scintillation material and the reading is used to adjust the gain. The problem of this approach is that the temperature versus gain curve is a function of both the pulse shaping time constant and the doping level of the inorganic scintillator. Doping is defined as the addition of a small amount of an impurity (e.g. thallium in a NaI crystal or cerium in a $LaCl_3$ crystal) to boost the light output from the scintillation material (crystal).

Third, use a temperature dependent photomultiplier tube divider as taught in U.S. Pat. No. 6,407,390 issued on Jun. 18, 2002 by Csaba M. Rozsa. This method extends the scintillation detector operating range down to ambient temperatures above 0° C. by using linear segmented approximations with a fixed gain assigned to each linear segment. Note this method works only for ambient temperatures above 0° C.

The fourth method involves the use of a light emitting diode (LED). By tracking the constant light reference pulse produced by a LED, the gain of the scintillation detector is stabilized. However, this approach is applicable only if the LED light pulse follows the amplitude and shape changes of the light pulse produced by the scintillation detector due to changes in the ambient temperature. Thus, this method does not work in the entire temperature range (−30° C. to +60° C.), but only for temperatures around the maximum of the temperature characteristic as displayed in FIG. 1.

Unlike the approaches described above, the apparatus and method of the present invention provides a novel and optimum solution for addressing all four factors that affect the spectrum gain dependence of inorganic scintillation detectors due to temperature.

The apparatus and method of the present invention addresses the problems incurred by temperature dependence and count rate limitations, and offers higher practical counting rates when used with conventional scintillation materials. Up to 5 fold improvements in dynamic range without significant resolution degradation (less than 15% at 662 keV for up to 800K throughput cps) or peak shift [less than 2% shift for up to 800K throughput cps] are made possible by applying the present invention to scintillation detectors. Devices employing the present invention may operate over a wide temperature range (−30° C. to 60° C.) without use of an external radiation source for temperature stabilization.

The present invention will improve the performance of many well-known particle-probe devices such as CAT scanners by providing an expanded count rate (greater than a factor of 5). The expanded count rate is a consequence of the step response exhibited by the preamplifier used in the present invention to the scintillator's light pulse. The step response eliminates the "pile-up" effects due to slow components of the light pulse and related deterioration of the light spectra at higher count rates.

By expanding the count rate, patient exposure time can be reduced, or the counting statistic may be increased, by the same factor. An expanded counting range also allows portal detectors to differentiate between patients who have recently undergone radiological treatments and industrial shipments with substantial radioactive sources (e.g., soil density monitors).

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes an apparatus and corresponding method for temperature correction and count rate expansion of inorganic scintillation detectors. A temperature sensor is attached to an inorganic scintillation detector. The inorganic scintillation detector, due to interaction with incident radiation, creates light pulse signals. A photoreceiver processes the light pulse signals to current signals. Temperature correction circuitry that uses a fast light component signal, a slow light component signal, and the temperature signal from the temperature sensor to corrected an inorganic scintillation detector signal output and expanded the count rate.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention comprises an apparatus and method that compensates for ambient temperature effects on scintillation detector performance. Specifically, the temperature effects are: [1] temperature coefficients of the photomultiplier tube (PMT) gain and photo-cathode sensitivity; [2] temperature dependence of the scintillator light yield; [3] temperature dependence of the scintillator decay time constant; and [4] the characteristic of the signal shaper that is used in the electronics package.

Through the use of dopants to boost inorganic scintillation material light output, material scientists discovered there were two components to an emitted light pulse: fast and slow. The fast light component exhibits decay times of ~0.25 µs, and the slow light component exhibits decay times of a few microseconds. Historically, the importance of the slow light component on detector efficiency had been dismissed, leading to the belief that the light yield from scintillation material was nonlinear as shown in FIG. 1. However, we have found that when both the fast and slow components are taken into account, the temperature coefficient of total emitted light from scintillation material is actually constant over the entire temperature range. Thus, the light yield from scintillation material is actually a linear function of the temperature.

Figure 3:
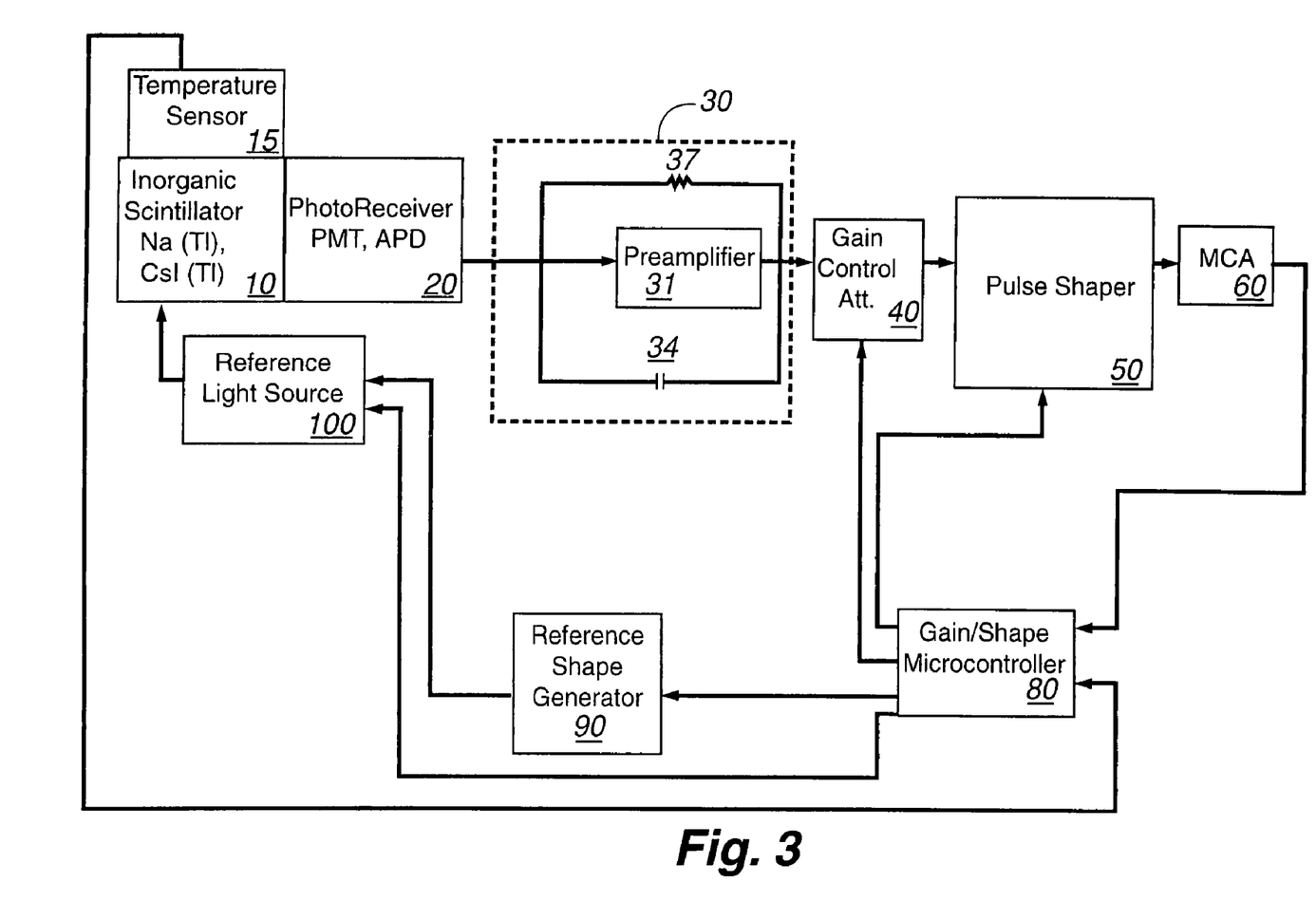
FIG. 3 is a schematic of a first embodiment of the present invention.

Referring now to FIG. 3, the first embodiment of the present invention compensates for temperature using a standard preamplifier and pulse shaper setup. Inorganic scintillator 10 (e.g., NaI (Tl), CsI (Tl), LaCl$_3$ (Ce), and the like) is optically coupled to photoreceiver 20 (e.g., photomultiplier tubes (PMTs), photodiodes, and avalanche photodiodes (APD)). Output from photoreceiver 20 is directed to temperature correction circuitry for temperature and gain correction that includes charge-sensitive preamplifier package 30, gain control attenuator 40, pulse shaper 50, and multichannel analyzer (MCA) 60.

A feedback loop is used to adjust for ambient temperature changes affecting scintillator 10. The feedback loop incorporates microcontroller 80, reference shape generator 90, and reference light source 100.

Charge-sensitive preamplifier package 30 comprises high-impedance inverting amplifier 31 connected in parallel with capacitor 34 and resistor 37. Resistor 37 is used to prevent circuit saturation. The current pulse input from photoreceiver 20 is converted by capacitor 34 into a voltage pulse output from preamplifier package 30 with an amplitude that is proportional to the total energy contained in the original light pulse. Amplifier 31 maintains the current signal from photoreceiver 20 independent of the voltage across capacitor 34.

The rise time of the output pulse generated by preamplifier package 30 is equal to the duration of the light pulse from scintillator 10. The rise time may be on the order of several microseconds. Thus, even if the shaping time constant is much shorter than light pulse duration, the duration of the shaped pulse is still limited by the duration of the light pulse (see FIG. 5b). Therefore, the throughput and pulse height spectrum deteriorate at higher count rates due to signal pile-up caused by the slow light components. The present invention addresses the deterioration by addressing the rise time of the output pulses from preamplifier package 30, allowing for an expanded count rate (greater than a factor of 5).

The pulse shape, U(t), at the output of preamplifier package 30 is $$U(t) = \frac{Q_1 + Q_2}{C}\left(1 - \frac{Q_1}{Q_1 + Q_2}\exp\left(-\frac{t}{\tau_1}\right) - \frac{Q_2}{Q_1 + Q_2}\exp\left(-\frac{t}{\tau_2}\right)\right), \quad (1)$$

where $Q_1$, $\tau_1$ describe the charge and time constant of the fast light component, respectively, and $Q_2$, $\tau_2$ describe the charge and time constant of the slow light component, respectively.

Gain control attenuator 40 adjusts the output of preamplifier package 30 based on feedback signals from microcontroller 80, and provides an input pulse to pulse shaper 50. Pulse shaper 50 provides shaped electronic pulses for MCA 60. The output signal of pulse shaper 50 does not depend on the shape of the light pulse and is proportional to the light output of scintillator 10. Shapers that provide a flat top pulse response are preferred for this embodiment and may be based on analog or digital signal processor (DSP) technology. The gated integrator is the most popular shaper that exhibits flat top pulse responses.

Figure 4:
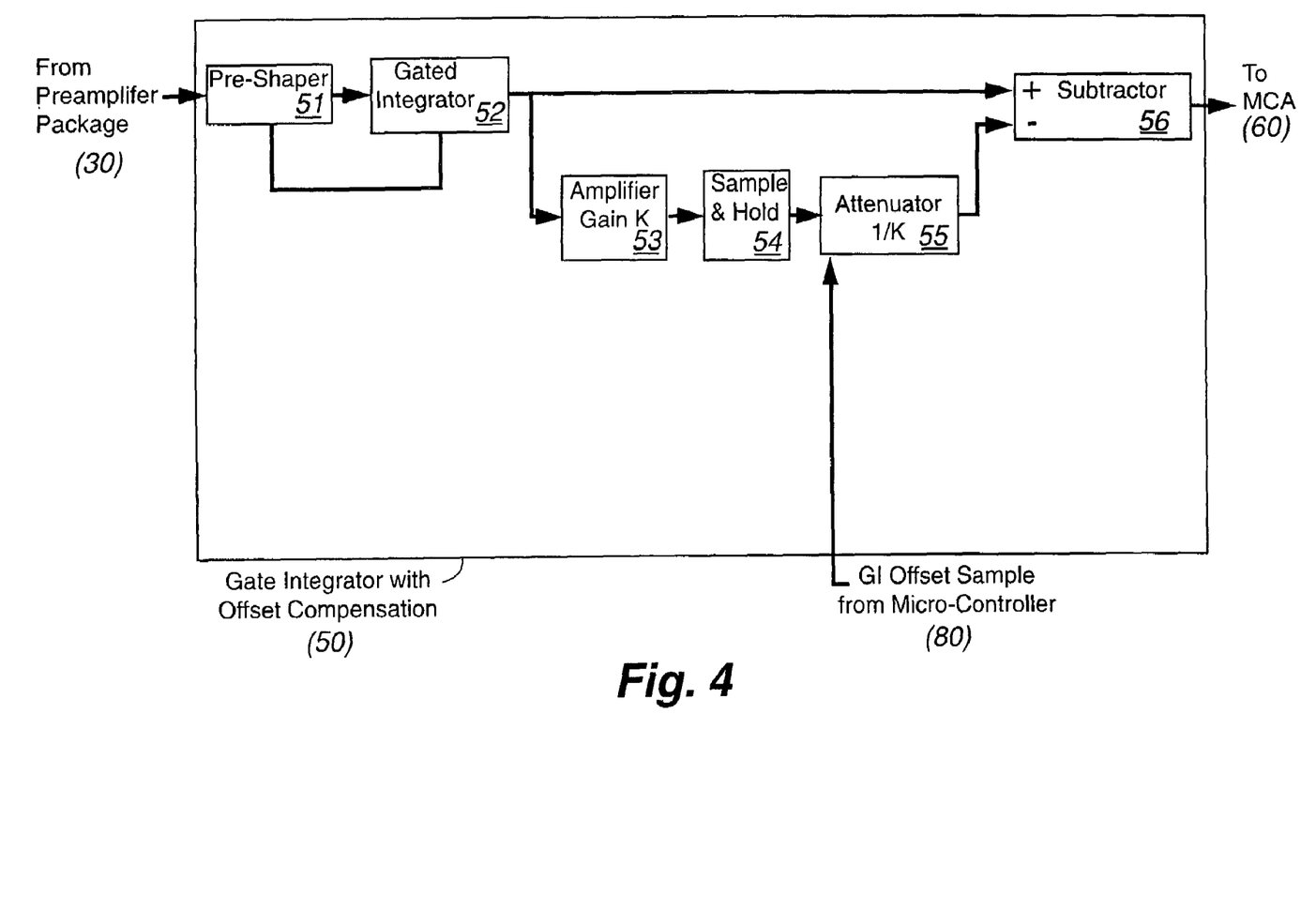
FIG. 4 is a schematic of the present invention gated integrator with offset compensation.

Referring now to FIG. 4, gated integrator with offset compensation (pulse shaper) 50 determines a baseline signal offset when there are no pulses from scintillation detector 10. This evolution is performed because gated integrator module 52 is very sensitive to the offset signal of pre-shaper 51 for slow pulses, as integrating pulses with little amplitude may introduce significant error during signal processing. Thus, gated integrator module 52 performs a signal measurement in the absence of a signal from preamplifier 30 in order to compensate for possible errors induced by the processing of the slow pulse signal when preamplifier package 30 is generating a signal. The signal offset from gated integrator module 52 is amplified and averaged by amplifier gain unit 53. The output from amplifier gain unit 53 is then stored in sample and hold module 54.

The DC voltage signal from sample and hold module 54 represents the amplified real offset of gated integrator module 52. This voltage signal is attenuated in attenuator module 55 by the same factor as the gain on amplifier gain unit 53 and then subtracted from the pulses coming from gated integrator module 52 in subtractor unit 56. Attenuator module 55 receives a gain compensation signal from micro-controller 80. The amplification and attenuation reduces the inherent errors produced by non-linear devices like sample and hold module 54. Note that when an actual scintillator 10 (FIG. 3) pulse signal is processed it is not stored in sample and hold module 54 and is instead directed straight to subtractor module 56.

Figure 5A:
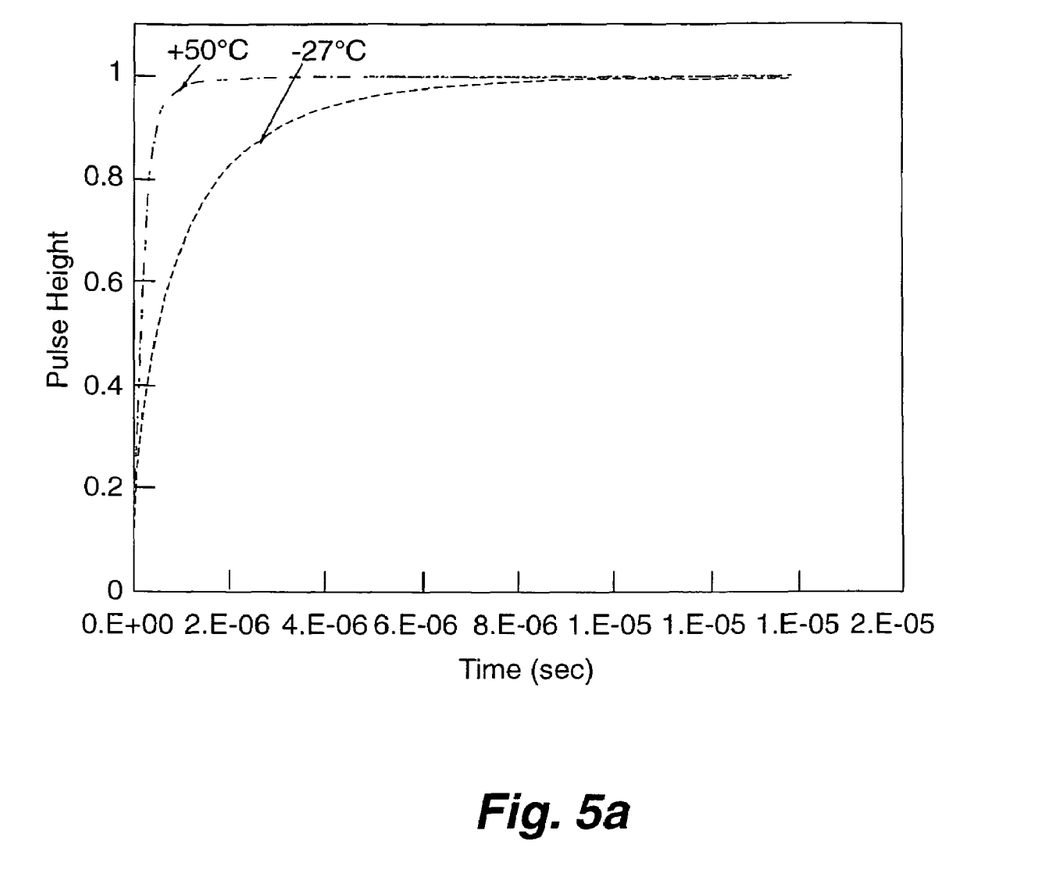
FIG. 5a graphically shows the normalized preamplifier pulse height over time for −27° C. and 50° C.
Figure 5B:
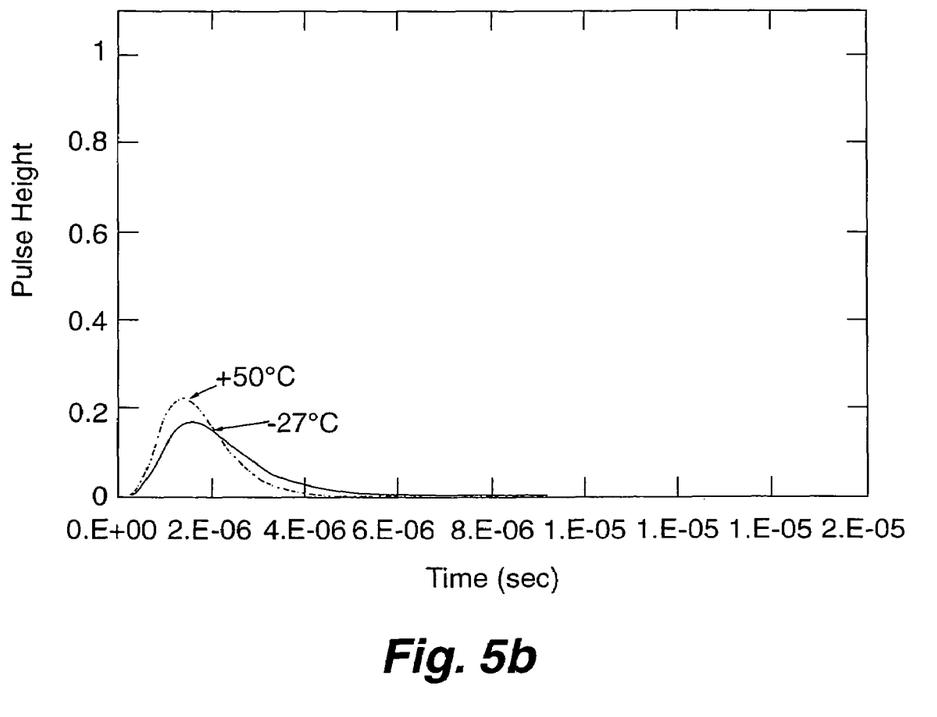
FIG. 5b graphically shows the normalized gated integrator pulse height for 0.5 microsecond semi-Gaussian shaping over time for −27° C. and 50° C.
Figure 5C:
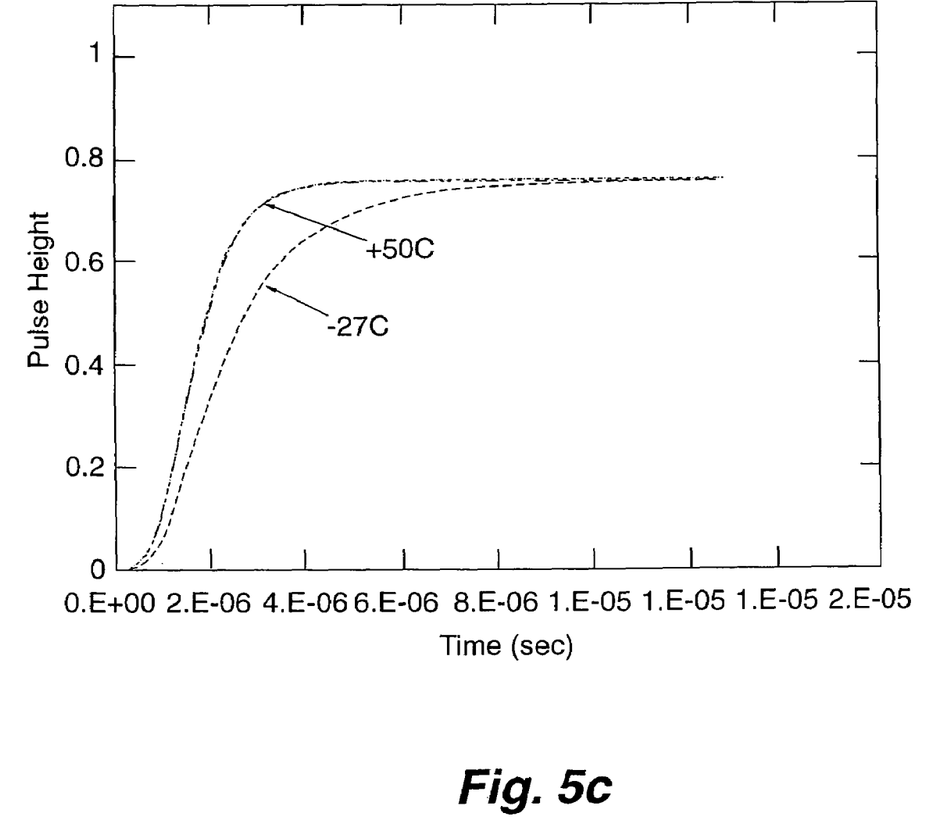
FIG. 5c graphically shows the normalized gated integrator pulse height for over time for −27° C. and 50° C.

When the integration time is equal to, or exceeds, the duration of the original light pulse, the shaped pulse is independent of the shape of the original light pulse. FIG. 5a shows the influence of scintillator temperature on preamplifier package 30 output pulse. Note that a lower temperature increases the rise time of the output pulse equal to the duration of the scintillator's light pulse. FIG. 5b shows the influence of scintillator temperature on the output pulse from 0.5 microsecond preshaper module 51 where the increase rise time of preamplifier package 30 output pulse leads to a lower pulse height (i.e., shaper sees lower portion of total scintillator light pulse). FIG. 5c shows gated integrator 50 output pulse that is proportional to the total area of 0.5 microsecond preshaper module 51 output pulse. It is important to note that the pulse height is independent of the shape of the scintillator light pulse and is equal to the total light yield of the scintillator, and where the total light yield dependence is a linear function of the scintillator temperature.

In this first embodiment, the inorganic scintillator exhibits a linear temperature dependency over the entire operating range. Using a model that includes fast and slow time constants, the current pulse $I_{SC}(t)$ from the photoreceiver 20 is described by:

$$I_{SC}(t) = \frac{Q_1}{\tau_1}\exp\left(-\frac{t}{\tau_1}\right) + \frac{Q_2}{\tau_2}\exp\left(-\frac{t}{\tau_2}\right). \quad (2)$$

Note that in this first embodiment the rise time of preamplifier package 30 is determined by the duration of the slow light component of the current pulse.

Above ambient temperature, the intensity of the slow component of the light pulse is a small fraction of the total light pulse. Pulse shaper 50 processes most light emitted by scintillator 10; therefore, the temperature dependence of the pulse height spectrum follows the total light yield temperature dependence, which is linear over the entire temperature range.

Figure 6:
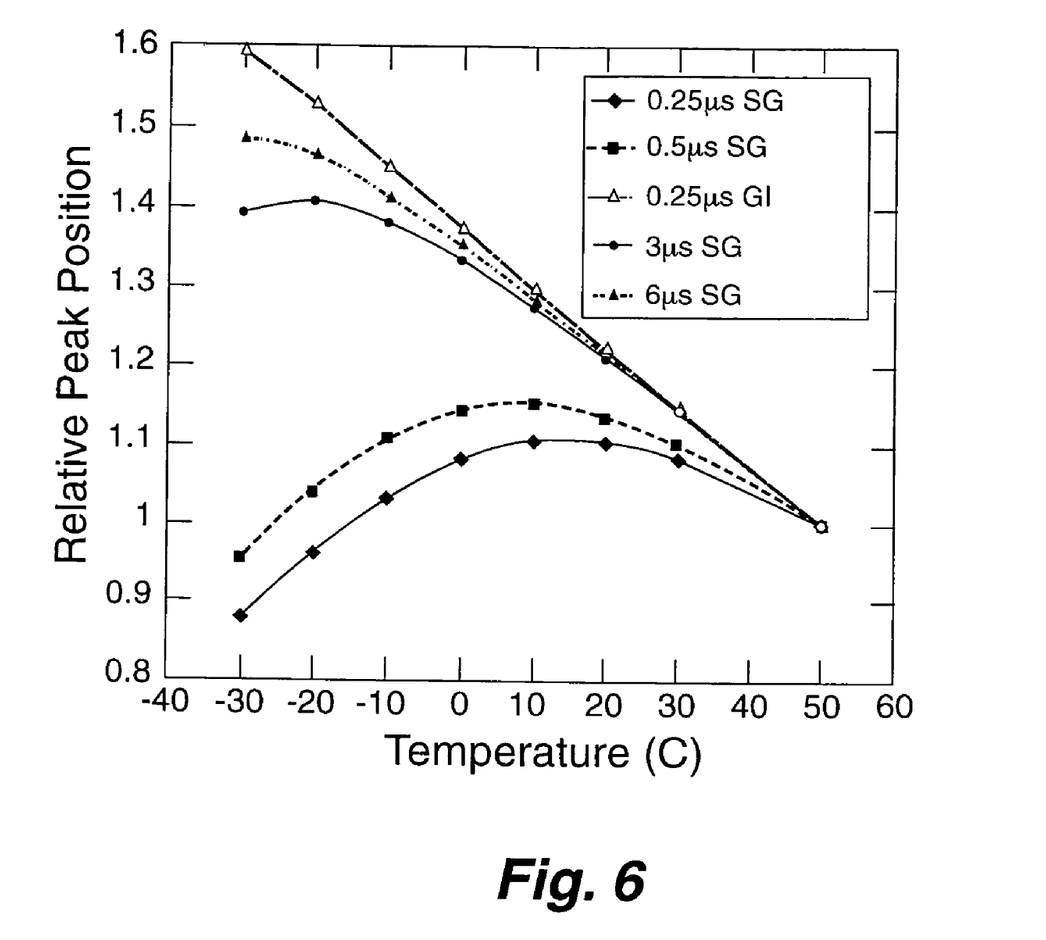
FIG. 6 graphically shows relative peak position displayed on Multi-Channel Analyzer of Cs-137 662 keV line versus NaI (Tl) crystal temperature.

Below ambient temperature, the redistribution between slow and fast components is significant; therefore, pulse shaper 50 processes a diminishing fraction of the light emitted by scintillator 10. The effect is opposite to the total light yield temperature dependence. Thus, the temperature dependency is also function of the shaping circuitry within pulse shaper 50. For example, FIG. 6 shows that a 0.5 μs Gaussian shaper temperature dependency flattens at around 10° C. and then dives steeply at negative temperatures.

There are two modes of operation for the configuration shown in FIG. 3. The first mode provides only temperature correction. The second mode provides temperature correction and gain stabilization.

Referring again to FIG. 1, in the first mode, a signal output from temperature sensor 15 into micro-controller 80, allows micro-controller 80 to output a control signal adjusting the setting of gain control attenuator 40 by a coefficient that compensates for the effect of the temperature on the total current pulse output from photoreceiver 20. In this first mode, reference shape generator 90 and reference light source 100 are not used.

In the second mode, stable reference light source 100 injects light pulses into scintillator 10 that are collected by photoreceiver 20. In this second feedback mode, microcontroller 80 and reference shape generator 90 compensate for both the scintillator pulse shape and the stability of the interface between scintillator 10 and photoreceiver 20.

Note that the area under the curve of the reference light pulse provided by reference light source 100 must vary with the temperature affected total light yield of scintillator 10. Thus, the frequency of the reference light pulse is based on the dynamic temperature characteristics exhibited by scintillator 10 and is usually in the range of tens of pulses per second.

The system is designed so that the reference light pulse, after all subsequent signal processing, appears as a peak near the upper end of the energy scale displayed by MCA 60. This peak in the spectrum is henceforth referred to as the "Reference Peak". Micro-controller 80 periodically calculates the centroid of the reference peak from MCA 60 and outputs a control signal that adjusts the system gain via gain control attenuator 40 in order to maintain the reference peak in the upper end of the energy scale. Because the reference light peak exhibits the same temperature response as the light pulse from scintillator 10, the corresponding spectrum will track to the reference peak. Thus, in this mode, both temperature correction and gain stabilization are provided.

Figure 7:
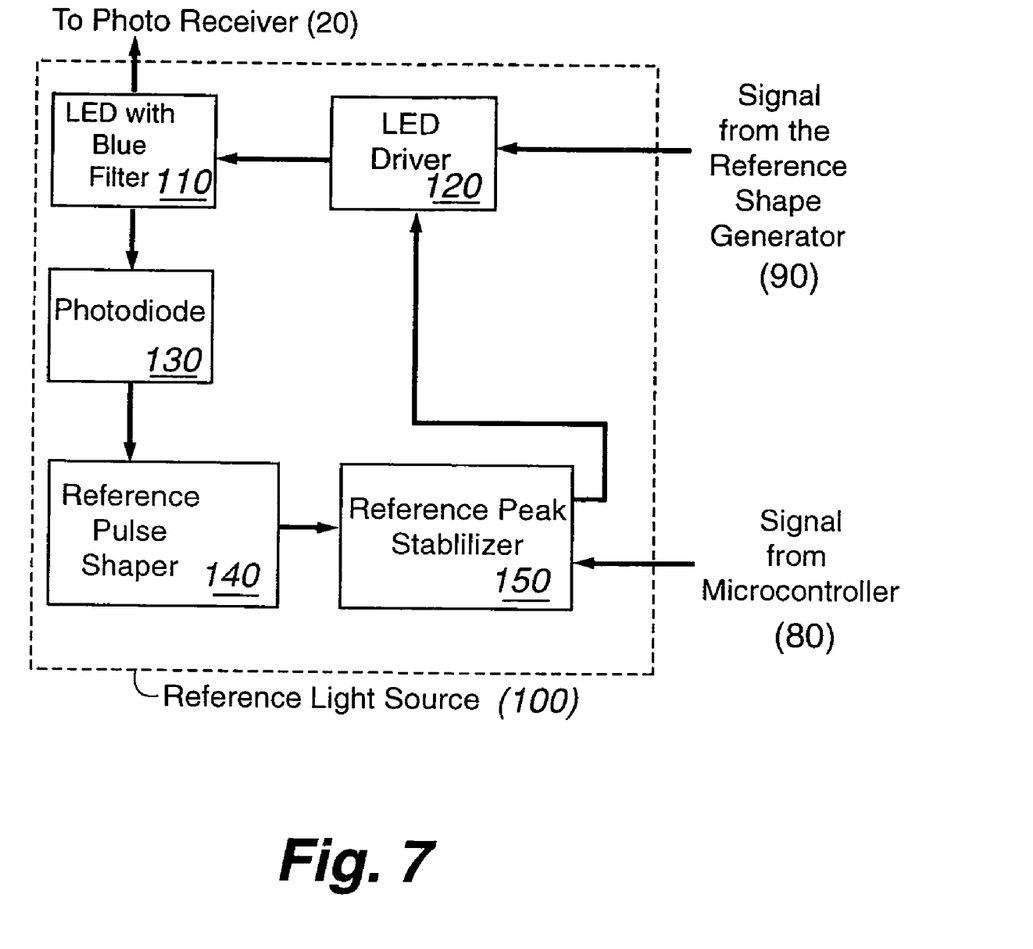
FIG. 7 is a schematic of the present invention reference light source.

Referring now to FIG. 7, reference light source 100 includes LED with blue filter 110, LED driver 120, photodiode 130, reference pulse shaper 140, and reference peak stabilizer 150. The internal stabilization loop provided by this configuration addresses the fact that LEDs are not stable over time.

The light pulse generated by LED driver 120 is split between photoreceiver 20 and photodiode 130 (i.e., Si P—In photodiodes are very stable over time). Reference pulse shaper 140 shapes the signal from photodiode 130. The shaped pulse output from reference pulse shaper 140 is input to reference peak stabilizer 150 where the output is compared with the output control signal (Uref) generated by microcontroller 80 and is used as a feedback signal to control LED driver 120; thus, stabilizing the LED light pulse to photoreceiver 20. Note that the Uref signal varies with the light yield temperature coefficient.

Figure 8:
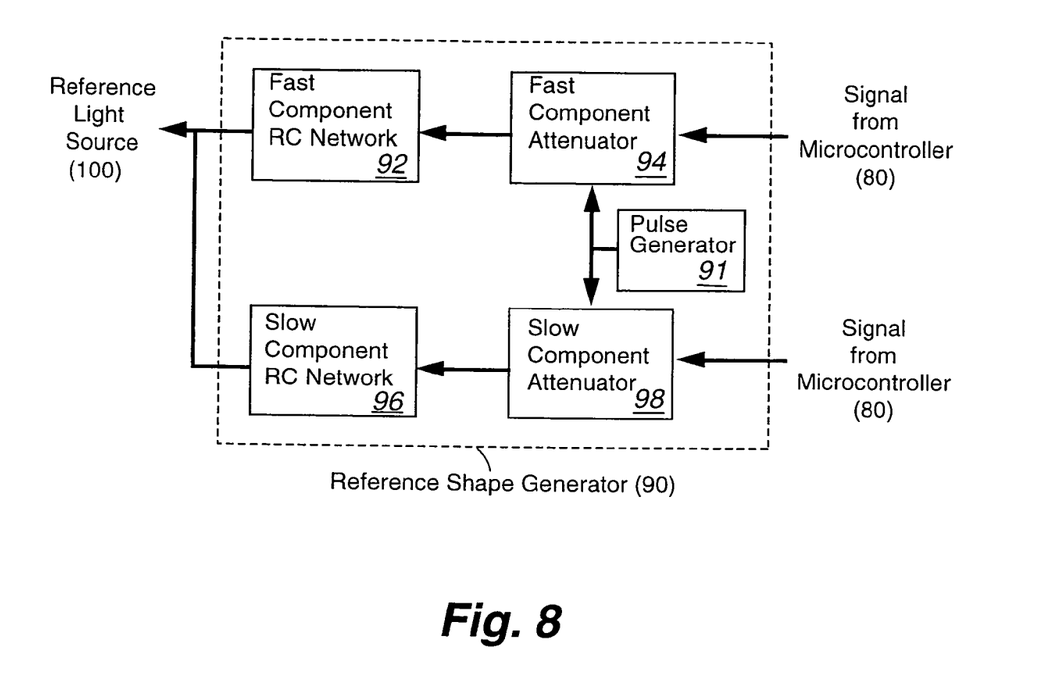
FIG. 8 is a schematic of the present invention reference shape generator.

Referring now to FIG. 8, reference shape generator 90 generates a reference signal the same shape and amplitude of the scintillator pulse created by incident radiation. In order to simulate both the fast and slow light components of the pulses generated by scintillator 10, two independent generators, fast component attenuator 94 with fast component RC network 92 and slow component attenuator 98 with slow component RC network 96, are placed in parallel. Pulse generator 91 provides a shape voltage with constant amplitude and frequency.

Fast component attenuator 94 and slow component attenuator 98 provide a fraction of the output voltage from pulse generator 91 to respective RC networks 92, 96. RC networks 92, 96 act as differentiation circuitry and convert the output voltage to exponential pulses with time constants proportional to the fast and slow light components exhibited in the light pulses from scintillator 10.

Shape generator 90 operates on two levels of complexity, depending on the compensation used in preamplifier package 30. On the first level, using the configuration displayed in FIG. 3, where pulse shaper 50 is not sensitive to the shape of the light pulse, only fast component generator 92 is used. The reference pulse is produced proportional to the temperature affected total light yield of scintillator 10 as specified by the output control signal of microcontroller 80.

Figure 9:
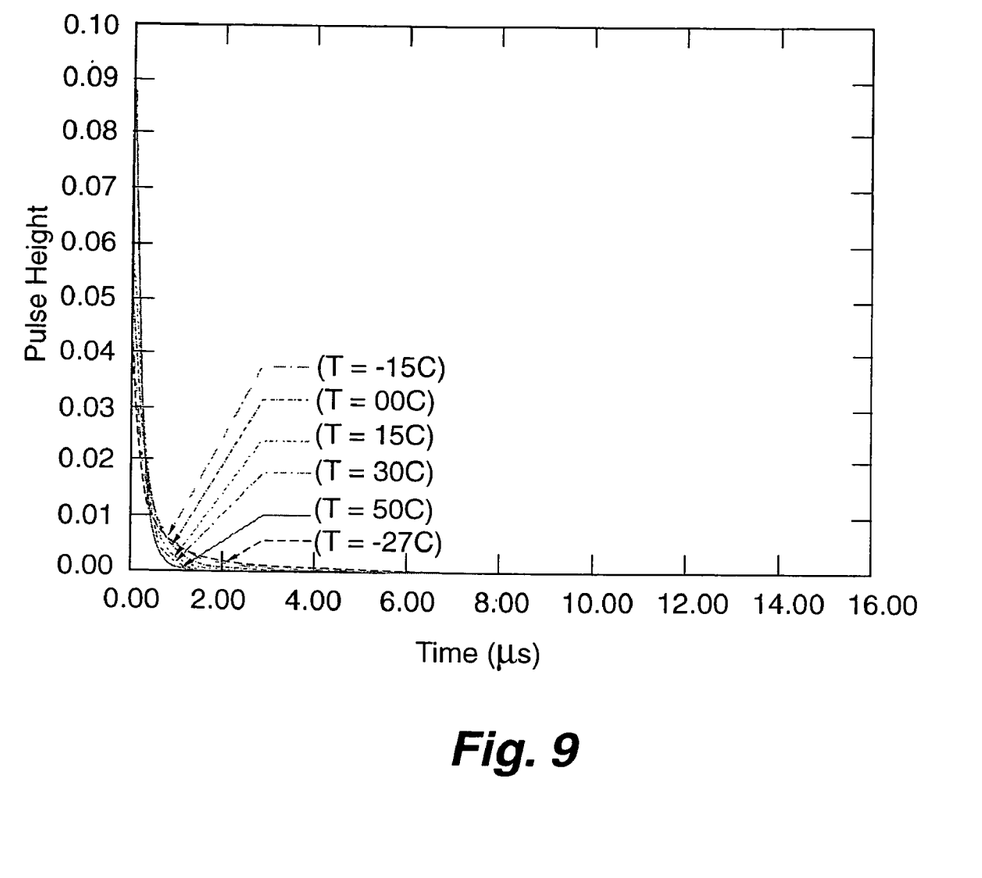
FIG. 9 graphically shows normalized NaI (Tl) light pulse height over time for varying NaI (Tl) crystal temperatures.

On the second level of complexity, the ratio between the amplitudes of the fast and slow light components produced by shape generator 90 tracks the ratio of normalized fast and slow components of the scintillator light pulse. FIG. 9 shows this by graphing the normalized NaI(Tl) light pulse height over time for varying NaI(Tl) crystal temperatures.

Fast component generator 92 and slow component generator 96 generate exponential pulses exhibiting a time constant corresponding to the light pulses emanating from scintillators 10. Thus, the output pulse of reference shape generator 90 exhibits the same shape and temperature dependence as the scintillator light pulse caused by the incident radiation. Reference light source 100 then converts the output pulse of reference shape generator 90 into a stabilized LED pulse, which in turn provides the reference peak in MCA 60.

Figure 10:
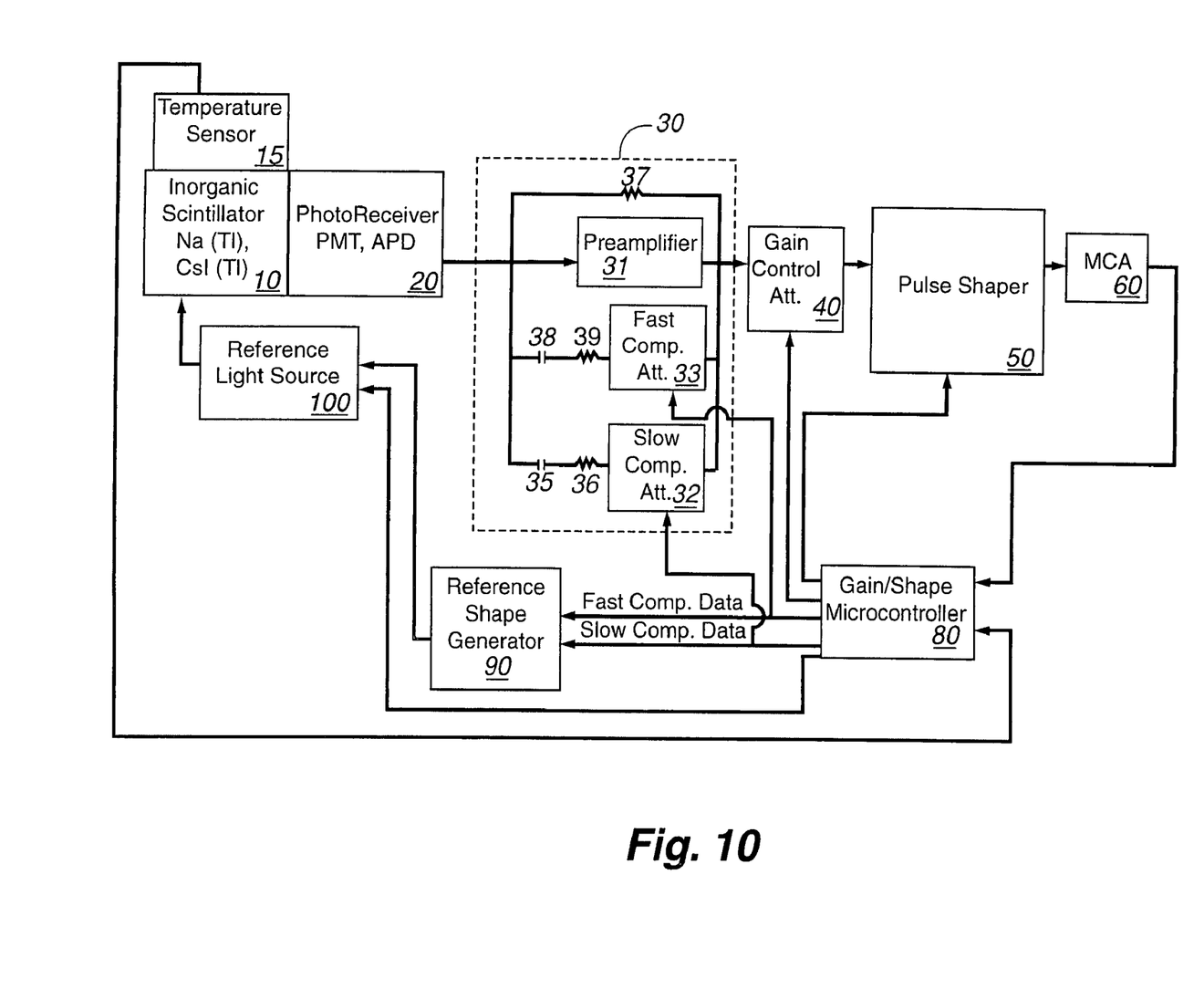
FIG. 10 is a schematic a second embodiment of the present invention.

Referring now to FIG. 10, a second embodiment of the present invention also provides two modes of operation. Mode 1 corrects for scintillator temperature and stabilizes gain by compensating for the slow light component only. In the second embodiment, preamplifier package 30 response includes a rise time equal only to the fast light component, leading to an expanded count rate. Mode 2 corrects for scintillator temperature and stabilizes gain by compensating for both the slow and fast component light pulses, and also provides for an expanded count rate.

In Mode 1, preamplifier package 30 incorporates slow component $R_2C_2$ network 35, 36 with programmable slow component attenuator (voltage divider) 32 to process slow component light pulses. Programmable slow component attenuator 32 acts like a digital potentiometer in that the fraction ($m_2$) of output voltage of preamplifier 31 is provided to component $R_2C_2$ network 35, 36 and is proportional to the code provided by the output control signal of microcontroller 80. In this mode, fast component $R_1C_1$ network 38, 39 and corresponding programmable fast component attenuator (voltage divider) 33 is compensating for the pulse height but not for the shape by making the resistance of resistor 39 equal to zero.

Preamplifier package 30 output voltage may then be written in the Laplace domain as:

$$U(s) = \frac{Q_1 + Q_2}{s(m_1 C_1 + m_2 C_2)} \times \frac{1 + s\left(\frac{Q_1 \tau_2 + Q_2 \tau_1}{Q_1 + Q_2}\right)}{(1 + s\tau_1) \times (1 + s\tau_2)} \times \frac{1 + s(R_2 C_2)}{\left(1 + s\left(\frac{m_1 C_1 C_2 R_2}{(1 + s) \times (C_2 R_2)}\right)\right)}, \quad (3)$$

where s is the Laplace operator, $m_1$ is the fraction of the fast component charge, $m_2$ is the fraction of the slow component charge, $C_1$ is the value of capacitor 38, $C_2$ is the value of capacitor 35, and $R_2$ is the value of resistor 36.

Given:

$$m_1 = \frac{Q_1}{Q_1 + Q_2}, m_2 = \frac{Q_2}{Q_1 + Q_2}, \text{ where} \quad (5)$$

$C_1 = C_2 = C$ (the capacitors values are the same), then $$R_1 = \frac{\tau_1}{C_1}, R_2 = \frac{\tau_2}{C_2}, \text{ yielding}$$

$$U(s) = \frac{Q_1 + Q_2}{C} \times \frac{1}{s(1 + s\tau_1)} [\text{Laplace Form}];$$

$$U(t) = \frac{Q_1 + Q_2}{C} \times \left(1 - \exp\left(-\frac{t}{\tau_1}\right)\right).$$

The reference pulse height is selected by system design so that the corresponding reference peak is positioned on the upper end of the scale on MCA 60. Gain microcontroller 80 calculates the centroid of the reference peak and corrects system gain via gain control attenuator 40 in order to keep the reference peak in the specified position, and, thus, stabilize the pulse height spectrum displayed on MCA 60. The frequency of the reference pulse generated by reference shape generator 90 is determined by the rate of temperature change experienced by scintillator 10, in order to ensure proper control of system gain.

Mode 1 is a compromise between complexity and performance. The signal throughput is limited only by the fast light component, since only the slow component is addressed. However, the resultant is acceptable because pulse shaper 50 neglects the duration of the fast component.

Mode 2 uses preamplifier package 30 that compensates for both the slow and fast component light pulses. Preamplifier package 30 incorporates fast component $R_1C_1$ network 38, 39 with programmable fast component attenuator 33 for fast component light pulses, and slow component $R_2C_2$ network 35, 36 with programmable slow component attenuator 32 for slow component light pulses. As in Mode 1, programmable attenuators 32, 33 act like digital potentiometers, controlling fast fraction ($m_1$) and slow fraction ($m_2$) of preamplifier package 30 output voltage. Preamplifier package 30 output voltage may then be written in the Laplace domain as:

$$U(s) = \frac{Q_1 + Q_2}{s(m_1C_1 + m_2C_2)} \cdot \frac{1 + s \cdot \frac{Q_1\tau_2 + Q_2\tau_1}{Q_1 + Q_2}}{1 + s \cdot \frac{m_1C_1C_2R_2 + m_2C_1C_2R_1}{(1+s\cdot C_1R_1)(1+s\cdot C_2R_2)}}, \text{ where} \quad (5)$$

$$m_1 = \frac{Q_1}{Q_1+Q_2}, m_2 = \frac{Q_2}{Q_1+Q_2}, C_1 = C_2 = C, \text{ then}$$

$$R_1 = \frac{\tau_1}{C_1}, R_2 = \frac{\tau_2}{C_2}, \text{ yielding}$$

$$U(s) = \frac{Q_1 + Q_2}{C} \cdot \frac{1}{s} \text{ [Laplace Form]};$$

$$U(t) = \frac{Q_1 + Q_2}{C} \cdot (t). \quad (6)$$

The current pulse from photoreceiver 20 is split and integrated in the fast and slow component networks. Reference shape generator 90 uses the configuration detailed in FIG. 7 to provide simulated pulse height and shape of both the slow and fast components of the detected light pulse. The time-constants of the pulse generators are defined by RC network 38, 39, and RC network 35, 36. Reference shape generator 90 provides an electrical pulse with amplitude and shape identical to that of the detected light pulse. Therefore, the signal from reference light source 100 has the same temperature coefficient as the total light yield of the scintillator.

According to Equation 6, the output of preamplifier package 30 is a step function. The output is pulse height and shape is maintained over the entire temperature range (−25° C. to 60° C.) by maintaining proper values of $m_1$, $m_2$ by attenuators 32, 33.

Both modes of the second embodiment provide a stable reference light source that is injected into scintillator 10 by reference light source 100 and collected by photoreceiver 20. Thus, the stability of the light interface between scintillator 10 and photoreceiver 20 is included in the system feedback loop. Reference shape generator 90 provides a reference pulse to reference light source 100 that closely approximates scintillator 10 detected pulse shapes and corresponding temperature dependence. The amplitude of the reference pulse is selected so that the reference pulse is positioned at the upper end of the scale on MCA 60. Gain microcontroller 80 calculates the centroid of the reference pulse and corrects the gain via gain control attenuator 40 in order to maintain the reference pulse in the specified position. The frequency of the reference pulses is determined by the speed of temperature changes in scintillator 10 and stability of the feedback loop system.

The second embodiment requires a complicated electronic setup and a reliance on a defined reference pulse shape. However, any commercial shaper and MCA may be used. Mode 2 of the second embodiment exhibits unique properties, like a rise time equal to the rise time of the photoreceiver's current pulse, a pulse height proportional to the total detected light, and a flat top time independent of the scintillator light pulse. The dynamic characteristics, such as throughput and resolution, provide for peak position stability over dynamic range several times higher than standard systems.

Model Validation

To validate the analytical model a 2″ by 2″ NaI (Tl) scintillation detector, manufactured by Bicron, was placed in a temperature-controlled chamber with a $^{137}$Cs source. The complete electronics package was maintained at a constant temperature. The preamplifier output of the detector setup was distributed to several shapers with different time constants. The temperature was cycled from +50° C. to −30° C. with a slope of 2° C./hr with an eight hour soak at steady state before each point was measured.

The anode current pulse and $^{137}$CS pulse height spectrum were acquired from each shaper. Simultaneously, the NaI(Tl) scintillator pulses were sampled with a digital oscilloscope. The photo-receiver's current pulses were normalized by total area are shown in FIG. 8. The digitized data was then used as input for digital simulations of the preamplifier in FIG. 5a, 0.5 μs semi-Gaussian shaper in FIG. 5b, and pulse shaper in FIG. 5c.

The rise time of the preamplifier output pulse (equivalent to the total light) follows the duration of the photo-receiver current pulse. The time to collect 99% of the total light varies from 2 μs at +50° C. to 10 μs at −27° C. The corresponding pulse height of the shaper with a 0.5 μs unipolar Gaussian pulse decreases monotonically with diminishing temperature. Note that as the temperature decreases, the pulse height is reduced and the pulse tail lengthens. The effect is similar to the well-known ballistic deficit (dependence of the shaped pulse height from the rise time of the input signal), but the rise time variation is caused by the changes in the light decay, not by the carrier's collection time in the charge output detectors.

A shaper with a flat-topped weighting function equal to the preamplifier's rise time variation was used in order to eliminate the ballistic deficiency. The gated integrator is the simplest filter with flattop weighting function; the integration time is determined by the total duration of the light pulse in order to linearize the temperature characteristic.

The experimental results using this new model demonstrates the effects of the temperature drift on the fast and slow light components. It is apparent from the results that a scintillation light pulse is modeled better by using charge distributed between fast and slow scintillation components, rather than by the traditional use of a single component with a variable time constant.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An inorganic scintillation detector having temperature correction and an extended count rate, comprising:
    (a) an inorganic scintillator outputting a scintillator light pulse signal from incident radiation,
    (b) a photoreceiver receiving said light pulse signal and outputting a current signal,
    (c) a temperature sensor attached to said inorganic scintillator and outputting a temperature signal indicative of a temperature of said scintillator, and
    (d) temperature correction circuitry receiving said current signal and said temperature signal, and configured to process a fast light component of said current signal, a slow light component of said current signal, and said temperature signal, and output a temperature corrected scintillator signal over an extended count rate.

2. The apparatus of claim 1 where said photoreceiver is selected from the group consisting of: photomultiplier tubes, photodiodes, and avalanche photodiodes.

3. The apparatus of claim 1 where said temperature correction circuitry comprises:
(a) a preamplifier package for integrating said current signal,
(b) a gain control attenuator for compensating said current signal for total light yield temperature dependence and gain stabilization,
(c) a pulse shaper for shaping said current signal,
(d) a multi-channel analyzer outputting a pulse height spectrum from said current signal, and
(e) a microcontroller for outputting a control signal to said gain control attenuator and said pulse shaper.

4. The apparatus of claim 3 where said preamplifier package comprises:
(a) a capacitor for integrating said current signal and creating a voltage step proportional to said output from said photoreceiver,
(b) a resistor for preventing circuit saturation, and
(c) an amplifier for maintaining said current signal from said photoreceiver independent of voltage across said capacitor.

5. The apparatus of claim 3 where said preamplifier package comprises:
(a) a programmable fast light component attenuator configured for scaling an integral of said current signal proportional to said fast light component, and a fast light component RC network for outputting a voltage step as a first weighted sum of a first integrated current signal and a first voltage drop of a fast light component current signal across said fast light component RC network resistor,
(b) a programmable slow light component attenuator configured for scaling an integral of said current signal proportional to said slow light component, and a slow light component RC network to provide a second voltage step as a second weighted sum of a second integrated current signal and a second voltage drop of a slow light component current signal across said slow light component RC network resistor,
(c) a resistor for preventing circuit saturation, and
(d) an amplifier for maintaining said current signal from said photoreceiver independent of voltage across said fast component attenuator, said fast component RC network, said slow component attenuator, and said slow component RC network.

6. The apparatus of claim 3 where said pulse shaper is a gated integrator with offset compensation.

7. The apparatus of claim 6 where said gated integrator with offset compensation comprises:
(a) a pre-shaper module for shaping said current signal and providing a pre-shaper output signal,
(b) a gated integrator module providing a gated integrator output signal proportional to said pre-shaper output signal,
(c) an amplifier gain unit for scaling up said gated integrator output signal and providing an output voltage signal,
(d) a sample and hold module for sampling said output voltage signal and providing an offset error voltage signal,
(e) an attenuator module for scaling down said offset error voltage signal, and
(f) a subtractor module for subtracting said offset error voltage signal from said gated integrator output signal.

8. The apparatus of claim 3 where said temperature correction circuitry further comprises:
(f) a reference shape generator outputting a reference pulse shape signal proportional to said scintillator light pulse, and
(g) a reference light source outputting a reference light pulse with amplitude and a shape determined by said reference shape generator.

9. The apparatus of claim 8 where said reference shape generator comprises:
(a) a fast component generator outputting a fast reference pulse shape and a fast reference amplitude to said reference light source, and
(b) a slow component generator outputting a slow reference pulse shape and a slow reference amplitude to said reference light source.

10. The apparatus of claim 8 where said reference light source comprises:
(a) a light emitting diode (LED) and a photodiode, said LED outputting said reference light pulse to said inorganic scintillator and said photodiode, said photodiode converting said reference light pulse to a first reference electrical pulse,
(b) a reference pulse shaper module for outputting a second reference electrical pulse from said first reference electrical pulse with an amplitude proportional to the total light produced by said LED,
(c) a reference peak stabilizer module and an LED driver module, where said reference peak stabilizer module compares said second reference electrical pulse height to a reference signal from said microcontroller, and outputs an amplitude feedback signal to said LED driver module, said LED driver module outputting an electrical pulse to said LED with a shape provided by said reference shape generator and an amplitude provided by said reference peak stabilizer.

11. A method for temperature correction and extension of count rate of inorganic scintillation detectors due to a temperature effect, comprising:
(a) detecting incident radiation with an inorganic scintillator and outputting a light pulse,
(b) determining a temperature of said inorganic scintillator at a time of detecting said incident radiation and outputting a temperature signal,
(c) converting said light pulse into a current pulse with a photoreceiver, and
(d) compensating for amplitude and shape of said current pulse with temperature correction circuitry.

12. The method of claim 11 where compensating for amplitude and shape of said current pulse comprises:
(a) converting said temperature signal into a control signal, and
(b) adjusting a gain control attenuator with said control signal to compensate for said temperature effect on said current pulse output from said photoreceiver.

13. The method of claim 11 where compensating for amplitude and shape of said current pulse comprises:
(a) producing a reference light pulse that includes a fast light component and a slow light component with a reference shape generator,
(b) injecting said reference light pulse into said inorganic scintillator so that a reference peak appears in a multichannel analyzer (MCA), and (c) compensating said scintillator pulse shape with a microcontroller by calculating a centroid of said reference peak, and adjusting a gain control attenuator to compensate for said inorganic scintillator temperature and provide gain stabilization.

14. The method of claim 13 where compensating amplitude and shape of said current pulse further includes:
(d) scaling an integral of said current pulse proportional to said slow light component and outputting a first voltage step as a first weighted sum from integrating said current pulse with a first voltage drop created by said current pulse across a first resistor, and
(e) scaling an integral of said current pulse proportional to said fast light component and outputting a second voltage step as a second weighted sum from integrating said current pulse with a second voltage drop created by said current pulse across a second resistor.

* * * * *